United States Patent [19]
Lutz

[11] Patent Number: 6,001,898
[45] Date of Patent: Dec. 14, 1999

[54] ELECTRON BEAM RADIATION CURABLE INKS FOR GAME BALLS, GOLF BALLS AND THE LIKE

[75] Inventor: Mitchell E. Lutz, Fairhaven, Mass.

[73] Assignee: Acushnet Company, Fairhaven, Mass.

[21] Appl. No.: 09/036,704

[22] Filed: Mar. 6, 1998

Related U.S. Application Data

[62] Division of application No. 08/807,501, Feb. 27, 1997.

[51] Int. Cl.$^6$ .............................. C09D 11/00; C09D 11/02
[52] U.S. Cl. ....................... 523/160; 522/909; 106/31.27; 106/31.6
[58] Field of Search .................................... 523/160, 161; 522/909; 106/31.6, 31.27

[56] References Cited

U.S. PATENT DOCUMENTS

| | | | |
|---|---|---|---|
| Re. 35,203 | 4/1996 | Wakalopulos | 250/492.3 |
| 3,661,614 | 5/1972 | Bassemir et al. | 427/493 |
| 4,228,438 | 10/1980 | Vazirani | 347/102 |
| 4,264,483 | 4/1981 | Laufer et al. | 260/23 |
| 4,303,924 | 12/1981 | Young, Jr. | 346/1.1 |
| 4,393,094 | 7/1983 | Garret, Jr. et al. | 427/500 |
| 4,410,560 | 10/1983 | Kosterka | 427/44 |
| 4,427,823 | 1/1984 | Inagaki et al. | 522/83 |
| 4,483,951 | 11/1984 | Brenner | 524/82 |
| 4,490,410 | 12/1984 | Takiyama et al. | 427/44 |
| 4,577,205 | 3/1986 | Shibata et al. | 346/204 |
| 4,603,162 | 7/1986 | Hasegawa et al. | 524/404 |
| 4,610,810 | 9/1986 | Hasegawa et al. | 252/511 |
| 4,613,403 | 9/1986 | Oyachi et al. | 156/643 |
| 4,836,102 | 6/1989 | Cicci | 101/41 |
| 5,098,483 | 3/1992 | Little et al. | 148/4 |
| 5,160,536 | 11/1992 | Harris et al. | 106/19 R |
| 5,166,186 | 11/1992 | Kojime et al. | 522/37 |
| 5,271,988 | 12/1993 | Ikemoto et al. | 428/195 |
| 5,281,569 | 1/1994 | Amon et al. | 503/201 |
| 5,354,367 | 10/1994 | Pennaz | 106/20 R |
| 5,407,708 | 4/1995 | Lovin et al. | 427/493 |
| 5,409,971 | 4/1995 | Wolfersberger et al. | 523/201 |
| 5,414,267 | 5/1995 | Wakalopulos | 250/492.3 |
| 5,464,707 | 11/1995 | Moulton et al. | 429/212 |
| 5,658,964 | 8/1997 | Amon et al. | 522/31 |
| 5,717,004 | 2/1998 | Hashimoto et al. | 522/84 |
| 5,739,077 | 4/1998 | Goto et al. | 503/200 |
| 5,785,612 | 7/1998 | Shapiro et al. | 473/377 |
| 5,820,491 | 10/1998 | Hatch et al. | 473/378 |
| 5,821,276 | 10/1998 | Duncan | 522/20 |

FOREIGN PATENT DOCUMENTS

| | | |
|---|---|---|
| 2030187A | 4/1980 | United Kingdom . |
| WO 94/13749 | 6/1994 | WIPO . |

OTHER PUBLICATIONS

Leach, R.H. and Pierce, R.J., The Printing Ink Manual, Chapman and Hall, London (pp. 285, 653, 655, 659–660), 1993.

Davis et al., 1996, "Chemistry Considerations for Low-–Voltage EB Applications", Sep./Oct. Radtech Report, pp. 18–20.

Primary Examiner—Vasu Jagannathan
Assistant Examiner—Callie E. Shosho
Attorney, Agent, or Firm—Pennie & Edmonds LLP

[57] ABSTRACT

Electron beam radiation curing of inks on game balls, golf balls and the like is disclosed. Production inks, logo inks and methods for forming production prints and logos on golf balls, game balls and the like are disclosed. To form an electron beam radiation curable water-insoluble production ink, at least an adhesion promoting component is added to an ink base. The adhesion promoting component is selected from the group consisting of a carboxylic acid functional monomer, a carboxylic acid functional oligomer, an ester functional monomer, an ester functional oligomer and mixtures thereof, the adhesion promoting component having at least one adhesion promoting functional moiety comprising at least about 2 moles of a carbonyl functionality per mole of the adhesion promoting component and being sufficient to maintain adhesion of the production ink of at least about 75% of the inked surface to the topcoat and to the surface of the game ball or the golf ball after electron beam radiation curing and after coating the production ink with the topcoat. To form an electron beam radiation curable water-insoluble logo ink, at least a toughening agent is added to an ink base. The toughening agent is sufficient to maintain adhesion of the logo ink to the topcoat of at least about 75% of the inked surface after electron beam radiation curing.

20 Claims, No Drawings

ELECTRON BEAM RADIATION CURABLE INKS FOR GAME BALLS, GOLF BALLS AND THE LIKE

This application is a division of U.S. patent application Ser. No. 08/807,501, filed Feb. 27, 1997, which is incorporated herein in its entirety by reference.

FIELD OF THE INVENTION

The present invention is directed to electron beam curing of electron beam (EB) curable inks applied to curved surfaces including spherical surfaces. More particularly, the invention is directed to EB curable inks and their application to and curing upon game balls, golf balls and the like. These inks are preferentially applied as single or multiple, clear or color layers for forming logos or production prints on game balls including golf balls.

BACKGROUND OF THE INVENTION

It is often desirable to apply clear, pigmented or dyed ink coatings or layers to form distinctive logos or production prints on game balls (e.g., golf balls, ping pong balls, billiard balls, baseballs, basketballs, racquet balls, handballs, etc.). Various commercially available inks are commonly used for this purpose.

To clarify the difference between logo printing and production printing, a brief description of these processes as they are applied to game balls such as golf balls (e.g., having curved surfaces) is provided below. Golf balls are commonly one-piece, two-piece or three-piece constructions. one-piece balls are made from a homogeneous polymer shaped into a golf ball. Two-piece golf balls comprise an inner core and an outer surrounding polymeric shell. Three-piece golf balls comprise various combinations of a core (wound or unwound), one or more intermediate polymeric shells and an outer polymeric cover. The cover polymer used in two-piece and three-piece balls may, for example, be balata, an ionomeric polymer (e.g., SURLYN®) or a polyurethane.

Golf ball covers are commonly painted with a primer coat which may be colored (e.g., white) or transparent. Alternately, the cover itself may contain a colorant. Typically, a tough, often glossy, topcoat is applied over the cover and/or the primer coat to form a protective outer seal on the golf ball. The topcoat may comprise, for example, a two component urethane. The topcoat typically increases the shine (i.e., glossy appearance) of the golf ball to enhance or brighten its appearance.

As used herein, "production printing" is when ink is applied directly to the cover or to the primer coat and the ink is then further coated with a topcoat. The image produced thereby is a "production" print and the ink used for this purpose is a "production" ink. In production printing, for some applications, when ink is applied directly to a cover, the cover surface is first roughened, for example, by sandblasting to enhance the bond between the ink and the cover. Thereafter, the ink is applied to the roughened cover. A transparent water based or solvent based overcoat may be applied over the ink layer and on the roughened cover to smooth out the cover and ink surfaces. Examples of such overcoats include urethane, polyester and acrylic. Thereafter, a topcoat is preferably applied to the overcoat.

Alternatively, "logo printing" as also used herein, involves the application of the ink directly onto a topcoat. The image produced thereby is a "logo" and the ink is a logo (or custom) ink. Thus, by use of production and/or logo printing one may add decorative markings such as a company trademark, symbol or the like to increase brand recognition and/or to enhance the appearance and/or the visibility of golf balls, game balls and the like.

Most commonly, logos and production prints are applied to golf balls by a pad printing process and apparatus. Pad printing uses an etched image plate (i.e., a cliche) having an etching of the desired image. The image plate, typically, is made of a tough material such as metal, steel, other alloy or photopolymer which normally has a uniform thickness except for the area defining the etched image. The plate may optionally be coated with one or more protectant layers or materials, to enhance its useful life.

During pad printing, ink is applied to the image plate, thus filling the etched image. Excess ink is then scraped off of the image plate, leaving behind ink only within the etched image. A printing pad is then momentarily lowered and pressed onto the inked image plate to lift ink off of the etched ink filled cavity onto the printing pad. The ink so lifted defines the shape of the etched image. The inked pad is then momentarily lowered and pressed onto, for example, a golf ball, thereby releasing the ink from the pad to the golf ball. The ink released from the pad forms, on the spherical surface of the ball, an image corresponding to that of the etched cavity.

This process of inking the image plate, scraping off excess ink, lifting off ink onto the printing pad and releasing the ink from the pad to the object (e.g., golf ball) to be inked may be repeated to print a plurality of images on a plurality of types of balls with various inks having desirable ink properties. The process of pad printing is well known. See, for example, U.S. Pat. Nos. 5,513,567 (Froh et al.); 4,896,598 (Leech, Jr.); 4,803,922 (Denesen); 4,745,857 (Putnam et al.); and 5,237,922 (Ho).

Printing pads are made from a resilient material such as silicone rubber which desirably picks up ink from the etched cavity of the image plate during lift-off and releases all of the ink lifted off when brought into contact with the article to be printed. Once the ink is deposited, it is cured, most commonly by a thermal curing process.

However, during manufacturing of printed articles such as game balls and golf balls, ink transfer problems are often encountered. For example, while it is desirable that all of the ink picked up by the printing pad be fully released onto the article to be printed, sometimes complete release is not achieved. Consequently, subsequent articles to be printed upon by the same printing pad member may have excessive ink or misaligned ink deposited thereon. Such improper ink deposition leads to unwanted ink contamination of balls, either directly between balls or indirectly by first transferring ink to ball handling equipment or both. Resolution of such problems requires expensive positioning equipment to prevent unwanted contact between balls, between ink depositing members and balls and between ball handling equipment and balls, respectively.

To overcome such ink transfer problems, intermediate thermal curing steps are introduced into the manufacturing process. There are several disadvantages to thermal curing, however. These include (1) high energy consumption, (2) long cooling cycles, (3) restricted material selection to thermally curable and thermally stable polymeric materials and (4) use of costly ventilating systems to dissipate vapors generated during thermal curing.

In addition to the problems associated with ink transfer before the ink is cured, post manufacturing problems are also commonly encountered even after curing takes place. Ink layers, after cure, may not possess a desirable level of adhesion to a substrate article surface. For example, a logo printed onto a golf ball topcoat is subjected to repeated "hard" impacts by a golf club during the golf ball's normal useful life. If adhesion, toughness, flexibility and/or hardness are at an undesirable level, ink deposited upon a topcoat (e.g., a logo printed upon a finished ball having an underlying topcoat or a clear coat) and/or ink deposited under a topcoat (e.g., a production print formed by the ink layer being interposed between the cover or primer coat and an overcoat and/or a topcoat) will abrade, flake, crack or otherwise separate from the golf ball topcoat, overcoat, the cover and/or the primer coats. After repeated impacts, such lack of adhesion, toughness, flexibility and/or hardness yields an unsightly golf ball.

To overcome these and other drawbacks, inks used in production and logo printing must have sufficient durability. Durability is influenced by such factors as ink layer flexibility (i.e., ink layer brittleness), ink layer resistance to abrasion, ink migration due to gravity, ink layer hardness, adhesion to golf ball cover polymers such as ionomers (e.g., SURLYN®), balata, polyurethane, polyolefin and mixtures thereof, adhesion to topcoats, adhesion to primer coats and intercoat adhesion between various layers of inks and/or other overcoats and/or topcoats.

To overcome these and other problems, novel inks (1) that are low energy curable, (2) that require minimal cooling, if any, (3) that are almost instantaneously cured, (4) that obviate or reduce the need for costly ventilating systems and (5) that permit the use of a broader range of polymeric cover, intermediate shell (or windings) or core golf ball and game ball materials are sought. These requirements are met by the low power electron beam curable inks which are the subject of the present invention.

SUMMARY OF THE INVENTION

It is therefore an object of the present invention to provide a novel, cost-effective and rapid electron beam radiation curing method for forming an ink print on a curved surface such as that found on a game ball, a golf ball or the like.

It is another object of the present invention to provide a method of forming a logo or production print on such a game ball, golf ball, etc. curved surface with improved durability, flexibility, hardness, etc., by the use of electron beam radiation curing.

It is a further object of the present invention to provide EB curable ink compositions having improved durability, flexibility, hardness, abrasion resistance, adhesion and ink transfer properties.

It is another object of the present invention to provide an EB curable ink composition suitable for production printing on game balls, golf balls and the like (e.g., sports equipment such as club heads, helmets etc., and other curved surfaces) having improved durability, flexibility, hardness, abrasion resistance, adhesion and ink transfer properties.

It is a still further object of the present invention to provide an EB curable ink composition suitable for logo printing on game balls, golf balls and the like having improved durability, flexibility, hardness, abrasion resistance, adhesion and/or ink transfer properties.

These and other objects are accomplished by the use of a novel, cost-effective and rapid method of curing ink layers on the curved surfaces of game balls, golf balls or the like using electron beam curing radiation. In one embodiment of the invention, electron beam radiation curable water-insoluble inks are deposited on, e.g., a golf ball to produce a logo or a production print, which is thereafter cured by application of electron beam curing radiation.

In another embodiment, the invention comprises an electron beam radiation curable water-insoluble production ink for forming an inked surface on at least a portion of the surface of a game ball, golf ball or the like wherein at least the inked surface is coated with a topcoat. The ink comprises an ink base containing at least a prepolymer with at least two prepolymer functional moieties. The prepolymer is selected from the group consisting of a first acrylate, an ester and mixtures thereof and a polymerizable monomer.

Added to the production ink base is an adhesion promoting component which may be a carboxylic acid functional monomer, a carboxylic acid functional oligomer, an ester functional monomer, an ester functional oligomer or mixtures thereof. The adhesion promoting component has at least one adhesion promoting functional moiety comprising at least about 2 moles of a carbonyl functionality per mole of the adhesion promoting component. It is sufficient to maintain adhesion of at least about 75% of the curved inked surface to the topcoat and to the surface of the game ball, golf ball or the like after curing and after coating with the topcoat.

A further embodiment is directed to a process for forming a production print on at least a portion of the curved surface of a game ball, golf ball or the like. For example, with golf balls as an example, the process comprises providing a golf ball having a curved surface; coating at least a portion of the golf ball surface with at least a layer of an electron beam curable water-insoluble production ink; curing the coating layer with electron beam radiation; and coating at least the inked surface with a topcoat.

An additional embodiment of the present invention is directed to an improved electron beam radiation curable water-insoluble logo ink composition. The water-insoluble logo ink includes an ink base comprising a prepolymer having at least two prepolymer functional moieties. The prepolymer is selected from the group consisting of a first acrylate, an ester and mixtures thereof and at least a polymerizable monomer.

Included in the logo ink base is a toughening agent. The toughening agent is sufficient to maintain adhesion of the logo ink to the topcoat of at least about 75% of the inked surface after electron beam radiation curing. The toughening agent may be sterically hindered monomers, dimers, trimers or oligomers, such as sterically hindered acrylates. Preferably, the toughening agents are also reactive diluents, (i.e., they form covalent bonds upon polymerization and are incorporated into the structure of the ink layer).

A still further embodiment involves a process for forming a logo on a game ball or golf ball topcoat. For example, in the case of a golf ball, the process comprises providing a golf ball having a topcoated surface; coating at least a portion of the surface with at least a layer of an electron beam curable water-insoluble logo ink; and curing the ink with electron beam radiation.

While the present invention is described mainly in terms of a golf ball, it should be understood that a variety of additional curved substrates (e.g., game balls) may be printed upon using the ink formulations and methods described and claimed herein without departing from the scope of the present invention.

DETAILED DESCRIPTION OF THE PREFERRED EMBODIMENTS

The following detailed description is provided to aid those skilled in the art in practicing the present invention. However, it should not be construed to unduly limit the scope of the present invention. Variations and modifications in the embodiments discussed may be made by those of ordinary skill in the art without departing from the invention.

The electron beam radiation curable water-insoluble production ink of the present invention is formed by modifying a base composition to incorporate at least an adhesion promoting component. The ink base composition comprises a prepolymer having at least two prepolymer functional moieties. The prepolymer is selected from the group consisting of a first acrylate, an ester and mixtures thereof and at least a polymerizable monomer.

Suitable first acrylates for use in conjunction with the present invention include, but are not limited to, acrylated amines, acrylic acrylates, oil acrylates, melamine acrylates, heterocyclic acrylates, epoxy acrylates, epoxy acrylates of bisphenol A, epoxy acrylates of bisphenol F, epoxy acrylates of bisphenol S, novolak acrylates, urethane acrylates, ether acrylates, polyether acrylates, thiol acrylates, thioether acrylates, polythioether acrylates, silicon acrylates, polystyryl acrylates, ester acrylates, polyester acrylates, aromatic acrylates, aliphatic acrylates, half-ester acrylates, di-ester acrylates, vinyl acrylates, polybutadiene acrylates, allyl acrylates, polyene acrylates, methacrylates, methacrylated amine, acrylic methacrylates, methacrylic methacrylates, oil methacrylates, melamine methacrylates, heterocyclic methacrylates, epoxy methacrylates of bisphenol A, epoxy methacrylates of bisphenol F, epoxy methacrylates of bisphenol S, novolak methacrylates, urethane methacrylates, ether methacrylates, polyether methacrylates, thiol methacrylates, thioether methacrylates, polythioether methacrylates, silicon methacrylates, polystyryl methacrylates, ester methacrylates, polyester methacrylates, aromatic methacrylates, aliphatic methacrylates, half-ester methacrylates, di-ester methacrylates, vinyl methacrylates, polybutadiene methacrylates, allyl acrylates, polyene methacrylates and the like and mixtures thereof.

The first acrylates are acrylated prepolymers having high molecular weights, for example, of at least about 500 grams per mole and have at least 2 polymerizable functionalities (i.e., prepolymer moieties) per molecule of prepolymer. Often, the acrylated prepolymers and the ester prepolymers have a high viscosity (e.g., 100–20,000 centipoise at 25° C.) and a molecular weight of between about 500 to about 5,000 grams per mole and between about 2 to 6 reactive prepolymer functional moieties per molecule. The ester may be an unsaturated ester.

The polymerizable monomers are considered reactive diluents. They may be monofunctional monomers or polyfunctional monomers. These polymerizable monomers are used to modify (e.g., typically to reduce) the viscosity of the acrylate prepolymer or the ester prepolymer. However, these monomers primarily aid in the cross-linking of the prepolymers upon electron beam radiation curing thereof. Electron beam curing is described below in detail. These monomers include, but are not limited to, one or more monofunctional acrylates or one or more polyfunctional acrylates. For example, the monofunctional acrylates have one acryloyl or methacryloyl group per acrylate molecule whereas the polyfunctional acrylates have two or more acryloyl or methacryloyl groups per acrylate molecule.

The adhesion promoting component is added, as noted above, to the ink base to yield a production ink. The adhesion promoting component improves the adhesion of the production ink to, for example, a golf ball cover or a primer coat when applied thereto and after being cured by electron beam radiation. The adhesion promoting component also improves the adhesion of the ink to a topcoat (e.g., a urethane topcoat) or to an overcoat (e.g., a water based urethane coat or a solvent based coat) when such coats are applied over the cured production ink.

The adhesion promoting component is selected from among carboxylic acid functional monomers, carboxylic acid functional oligomers, ester functional monomers, ester functional oligomers and mixtures thereof. The adhesion promoting component has at least one adhesion promoting functional moiety comprising at least about 2 moles of a carbonyl functionality per mole of the adhesion promoting component. The adhesion promoting component is added to the ink base to promote intercoat adhesion of the production ink. Intercoat adhesion, as used herein, is defined as adhesion to an underlying cover and/or primer coat and adhesion to an overlying topcoat and/or overcoat.

Preferably, the adhesion promoting component is selected from acrylate oligomers, aromatic acid acrylate esters, aromatic acid acrylate half esters, aromatic acid methacrylate esters, aromatic acid methacrylate half esters and mixtures thereof. The adhesion promoting component has at least about 2 moles of a carbonyl functionality, typically between about 3 to about 12 moles of a carbonyl functionality per mole of the adhesion promoting component or any value therebetween. Preferably, the adhesion promoting component has between about 3.5 to about 11 moles of a carbonyl functionality per mole of the adhesion promoting component. Further, the adhesion promoting component has a molecular weight of about 1,000,000 grams per mole or less, typically between about 100 grams per mole to about 1,000,000 grams per mole.

The carbonyl functionality of the adhesion promoting component can be a carboxylic acid functional moiety, an ester functional moiety, an anhydride functional moiety or a mixture thereof. Preferably, the adhesion promoting functional moiety is a carboxylic acid having, for example, an acid number of at least about 100. The acid number is defined as the quantity of base, expressed in milligrams of potassium hydroxide, that is required to neutralize the free acids present in one gram (1 gm) of the adhesion promoting component of the production ink, logo ink, etc. The acid number of the adhesion promoting component is about 300 or less, typically between about 100 to about 300 or any number therebetween. Preferably the acid number is between about 150 to about 250 and most preferably between about 200 to about 230.

Further, the adhesion promoting component is present in an amount of at least about 1% by weight of the total weight of the production ink. All weight percentages provided below are relative to the total weight of the ink containing a given component unless specifically indicated otherwise. The adhesion promoting component is present in an amount of about 75% by weight or less, typically between about 1% to about 60% or any value therebetween (e.g., 10–20%) and most preferably between about 5% to about 25% by weight.

Examples of suitable adhesion promoting components include products from SARTOMER Company, Inc. (Exton, Pa.) designated as SARBOX™ SB-501, SARBOX™ SB-401, SARBOX™ SB-510E35 and SARBOX™ SB-520E35. SB-501 is a highly functional, carboxylic acid terminated oligomer blended in 40% by weight (of the total weight of SB-501) of ethoxylated trimethylolpropane triacrylate monomer (designed as SR-454). SB-501 is further characterized as indicated below:

| Color, APHA | 100–200 |
| --- | --- |
| Weight/gallon (lbs./gal.) | 9.7–9.9 |
| Viscosity (cps) | |
| 25° C. | 200,000+ |
| 40° C. | 75,000–90,000 |
| 60° C. | 8,000–15,000 |
| 80° C. | 2,500–4,000 |
| Acid Number (mg KOH/gm) based on SARBOX ™ Resin Content | 130–180 |
| SARBOX ™ Resin Content (%) | 60.0 ± 2.0 |
| Flash Point (° F., Setaflash) | 200. |

SB-401 is a highly functional, carboxylic acid terminated, solid oligomer dissolved in 30% by weight (of the total weight of SB-401) of solvent. SB-401 is further characterized as indicated below:

| Color, APHA | 150–250 |
| --- | --- |
| Weight/gallon (lbs./gal.) | 9.3–9.6 |
| Viscosity (cps) | |
| 25° C. | 40,000–60,000 |
| 40° C. | 10,000–20,000 |
| 60° C. | 2,000–4,000 |
| Acid Number (mg KOH/gm) based on SARBOX ™ Resin Content | 130–160 |
| SARBOX ™ Resin Content (non-volatile content, %) | 68.0 ± 2.0 |
| Flash Point (° F., PMCC, Solvent) | 136. |

SB-510E35 is a 35% by weight (of the total weight of SB-510E35) moderately functional carboxylic acid containing methacrylate oligomer (i.e., aromatic acid methacrylate half ester resin) blended in 65% by weight (of the total weight of SB-510E35) of ethoxylated trimethylolpropane triacrylate monomer (designated as SR-454, the chemical structure of which is incorporated herein by reference). SB-510E35 is further characterized as indicated below:

| Color, APHA | 150–250 |
| --- | --- |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

SB-520E35 is a 35% by weight (of the total weight of SB-520E35) moderately functional carboxylic acid containing acrylate oligomer (i.e., aromatic acid acrylate half ester resin) blended in 65% by weight (of the total weight of SB-520E35) of ethoxylated trimethylolpropane triacrylate monomer (designated as SR-454). SB-520E35 is further characterized as indicated below:

| Color, APHA | 150–250 |
| --- | --- |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

Both SB-510E35 and SB-520E35 contain 100% reactive solids. These products are described in SARTOMER COMPANY PRODUCT MANUAL AND APPLICATION GUIDE.

The production ink of the present invention may further comprise a viscosity reducing component and/or a flexibility promoting component. The viscosity reducing component is any low molecular weight reactive diluent that reduces the viscosity of the production ink. Examples of viscosity reducing components (produced and sold by the SARTOMER Company) compatible with the present invention include, but are not limited to, highly propoxylated glyceryl triacrylate (SR-9021), ethoxylated$_3$ trimethylolpropane triacrylate (SR-454), ethoxylated$_6$ trimethylolpropane triacrylate (SR-499), ethoxylated$_9$ trimethylolpropane triacrylate (SR-502), ethoxylated$_{15}$ trimethylolpropane triacrylate (SR-9035), ethoxylated$_{20}$ trimethylolpropane triacrylate (SR-415), pentaerythritol triacrylate (SR-444), ropoxylated glyceryl triacrylate (SR-9020), propoxylated$_3$ trimethylolpropane triacrylate (SR-492), propoxylated$_6$ trimethylolpropane triacrylate (SR-501), trimethylolpropane triacrylate (SR-351), trimethylolpropane trimethylacrylate (SR-350), tris(2-hydroxy ethyl) isocyanurate triacrylate (SR-368, SR-368D and SR-290), dipentaerythritol pentaacrylate (SR-399), di-trimethylolpropane tetraacrylate (SR-355), ethoxylated pentaerythritol tetraacrylate (SR-494), pentaacrylate ester (SR-9041), pentaerythritol tetraacrylate (SR-295) and mixtures thereof. The preferred viscosity reducing agent is ethoxylated$_3$ trimethylolpropane triacrylate (SR-454) having a molecular weight of about 428 grams. Typically, the viscosity reducing component is present between about 10% to about 50% by weight of the total weight of the adhesion promoting component and any value therebetween (e.g., between about 0.1% to about 37.5% by weight of the total weight of the ink containing the viscosity reducing component.)

The flexibility promoting component compatible with the present invention has a post cure elastic modulus of between about 200 to about 60,000 pounds per square inch, a post cure tensile strength of between about 50 to about 2,500 pounds per square inch and a post cure elongation of between about 5% to about 350%. Further, the flexibility promoting component is any component that has a glass transition temperature (i.e., Tg) below about room temperature (e.g., below about 25° C.) The flexibility promoting component includes, but is not limited to, a second acrylate, a ring opening heterocycle and mixtures thereof, wherein the ring opening heterocycle is selected from the group consisting of cyclic esters, cyclic lactones, cyclic sulphides, cyclic acetals, cyclic siloxanes and mixtures thereof. The second acrylate is selected from the group consisting of an aliphatic urethane acrylate, an aromatic urethane acrylate, a polyether acrylate, an acrylated amine, a polybutadiene acrylate, a melamine acrylate and mixtures thereof. The cyclic ester of the flexibility promoting component includes an epoxide.

Additional examples of flexibility promoting components compatible with the present invention include, but are not limited to, urethane acrylate base resins designated by the SARTOMER Company as CN-962, CN-965, CN-966, CN-972, CN-973 and CN-981 and urethane acrylate resin/monomer blends designated as CN-965A80, CN-966A80, CN-966H90, CN-966J75, CN-973A80, CN-973H85, CN-973J75 and CN-981B88 and described in the SAR- TOMER COMPANY PRODUCT MANUAL AND APPLICATION GUIDE. Of these, CN-962, CN-965 and CN-966 are aliphatic urethane acrylate oligomers having a polyester backbone. CN-973 is an aromatic urethane acrylate having a polyester backbone. CN-972 is an aromatic urethane acrylate having a polyester backbone. CN-981 is an aliphatic urethane acrylate having a polyester backbone. In CN-965A80, CN-966A80, CN-966M90, CN-966J75, CN-973A8, CN-973M85, CN-973J75 and CN-981B88, the CN-966, CN-973 and CN-981 are the base resins, respectively. The letters A, B, H and J as used in the SARTOMER product designations refer to the monomers blended with the base resins. The number following the monomer letter designation indicates the percent by weight of the base resin, the remainder being the amount of the monomer making up the blend (i.e., totalling 100% by weight). Monomers A, B, H and J correspond to the SARTOMER designations tripropylene glycol diacrylate (SR-306), 1,6-hexanediol diacrylate (SR-238), 2(2-ethoxyethoxy) ethylacrylate (SR-256) and isobornyl acrylate (SR-506), respectively.

The flexibility promoting component is optionally added to the production ink composition in an amount of about 75% by weight or less, typically between about 5–60% by weight or any value therebetween. Preferably, the flexibility promoting component is present between about 10–30% by weight and most preferably between about 15–20% by weight.

Additionally, the production ink may optionally contain a solvent in an amount of between about 1–30% by weight of the total weight of the ink composition. Examples of solvents compatible with the present invention include, but are not limited to, (Fast Evaporating Rate Solvents): acetone, ethylacetate (85–88%), ethyl acetate (95–98%), ethyl acetate (99%), methyl acetate (80%), methyl ethyl ketone, iso-propyl acetate (95–97%), iso-propylether, tetrahydrofuran; (Medium Evaporating Rate Solvents): iso-butyl acetate (90%), n-butyl acetate (90–92%), n-butyl acetate (99%), sec-butyl acetate (90%), sec-butyl alcohol, tert-butyl alcohol, 1,1,1-trichloroethane, ethyl ketone, ethyl alcohol 200 PRF. ANHD, ethyl alcohol 190 PRF. ANHYD, ethyl alcohol 190 PRF. (95%), methyl alcohol, methyl isobutyl ketone, methyl isopropyl ketone, methyl n-propyl ketone, 2-nitropropane, n-propyl acetate (90–92%), iso-propyl alcohol, n-propyl alcohol; (Slow Evaporating Rate Solvents): amyl acetate (ex Fuel Oil) (85–88%), amyl acetate primary (mixed isomers)(95%), amyl alcohol primary (mixed isomers), tert-amyl alcohol, iso-butyl alcohol, n-butyl alcohol, butyl dioxitol™ glycol ether, butyl oxitol™ glycol ether, m-cresol, cyclohexanol, cyclohexanone, diacetone alcohol, dibasic ester, diethylene glycol, diethylene glycol monobutyl ether acetate (95%), diisobutyl ketone, dimethyl formamide, diethylene glycol, monoethyl ether— low gravity, diethylene glycol monoethyl ether—high gravity, dipropylene glycol monomethyl ether, dipropylene glycol monomethyl ether acetate, ethyl butyl ketone, ethyl-3-ethoxy propionate, ethylene glycol, 2-ethyl hexanol, 2-ethyl hexyl acetate (95%), ethylene glycol monoethyl ether acetate (95%), ethylene glycol monoethyl ether acetate (99%), ethylene glycol monobutyl ether acetate, hexylene glycol, isobutyl isobutyrate, isophorone, methyl n-amyl ketone, diethyl glycol monomethyl ether, methyl isoamyl ketone, methyl isobutyl carbinol, ethylene glycol monomethyl ether, n-methyl-2-Pyrrolidone, ethylene glycol monoethyl ether, propylene glycol, propylene glycol monomethyl ether, propylene glycol monomethyl ether acetate, propylene glycol mono tertiary butyl either, triethylene glycol; (Aliphatic Hydrocarbon Solvents): Mineral spirits, naphtha, or mixtures thereof and (Aromatic Hydrocarbon Solvents): Toluene, xylene or mixtures thereof. These solvents may be obtained from the Shell Chemical Company. Additional solvents well known in the art may be used.

Faster evaporating solvents are preferred for higher production rates (i.e., more balls production printed or logo printed per unit time). However, faster evaporating solvents typically yield higher levels of volatile organic compounds (VOCs) making them susceptible to greater regulation. On the other hand, slower evaporating solvents produce lower VOCs, but require longer drying times thereby lowering production rates.

The production inks may also optionally contain colorants such as pigments or dyes that are well known to those skilled in the ink formulation art in amounts sufficient to impart a desired color.

The logo ink of the invention differs from the production ink in that it contains different additive components due to differences in performance requirements of logos versus production prints. The logo ink comprises an ink base and at least a toughening agent. For logos, the same ink base as described for the production inks is used, i.e., comprising at least a prepolymer having at least two prepolymer functional moieties, wherein the prepolymer is a first acrylate, an ester or mixtures thereof and a polymerizable monomer. A further, optional additive to the logo ink base is friction reducing agent commonly referred to as a slip and mar agent.

Suitable toughening agents are sterically hindered acrylates, preferably, monomers, dimers, trimers or oligomers. Further examples of toughening agents compatible with the logo inks of the present invention include, but are not limited to, epoxy acrylate, isobornyl acrylate (SR-506), tetrahydrofurfuryl acrylate, cyclohexyl acrylate, dicyclopentenyl acrylate, dicyclopentenyl oxyethyl acrylate, vinyl toluene (styrene), isobornyl methacrylate, tetrahydrofurfuryl methacrylate, cyclohexyl methacrylate, dicyclopentenyl methacrylate, dicyclopentenyl oxyethyl methacrylate and mixtures thereof. The toughening agents preferably are reactive diluents which increase both the hardness and the flexibility of the ink base to yield a logo ink.

The toughening agent is present typically between about 5–75% by weight, or any value therebetween, of the total weight of the logo ink, preferably between about 5–30% by weight and most preferably between about 10–20% by weight.

In addition to the toughening agent, as noted above a friction reducing agent may be optionally added to the base ink to form a preferred logo ink. The friction reducing agent minimizes abrasion of the logo ink by sand, dirt and other abrasive materials or surfaces commonly encountered during golfing or during other typical uses of game balls. The friction reducing agent decreases the friction between the logo (i.e., printed with the logo ink) and external abrasive materials on contact, thereby minimizing the degradation of the logo. Examples of friction reducing agents compatible with the logo ink of the present invention include, but are not limited to, a solution of polyether modified dimethylpolysiloxane copolymer (BYK™-306; BYK™-341; BYK™-344), polyether modified dimethylpolysiloxane copolymer (BYK™-307; BYK™-333), a solution of acrylic functional, polyester modified dimethylpolysiloxane (BYK™-371), silicon acrylates and mixtures thereof. Of these, the reactive friction reducing agents such as silicon acrylates and acrylic functional, polyester modified dimethylpolysiloxanes (BYK™-371) are preferred because they form bonds and become integrated into the structure of the logo ink upon electron beam radiation curing. The BYK™ friction reducing agents are listed in the BYK product catalogue and may be obtained from BYK-Chemie USA of Wallingford, Connecticut.

The friction reducing agent is present in an amount of about 10% by weight (of the total weight of the logo ink) or less, typically between about 0.1–10% by weight or any value therebetween, preferably between about 0.6–4% by weight and most preferably between about 1–2% by weight.

The logo ink may further comprise between about 1–30% by weight of solvent, preferably about 5% by weight. Suitable logo ink solvents are the same as those previously listed for use with production inks.

In the case of logo inks, the ink is first deposited, for example, on a golf ball topcoat and then the logo ink is electron beam radiation cured. In contrast, the production ink layer is first deposited directly upon the cover surface or primer coat after which the ink layer is electron beam radiation cured. Then, overcoats and/or topcoats are applied to the cured ink layer to form a production print.

It is believed, although applicant is not bound by this theory, that in electron beam radiation curing, the electron beam ionizes components, for example, within the ink and/or a layer in contact with such ink, to form free radicals. These free radicals aid in the cross-linking of the various components and agents of the inks of the present invention with the substrate layers or articles in contact with such inks, thereby imparting greater durability, intercoat adhesion, abrasion resistance and the like to production prints or logos printed with such inks.

Once the inks are applied, they are cured. Curing is carried out by the novel use of cost-effective and rapid electron beam radiation curing of ink layers on golf balls as follows. Electron beam radiation is generated with the use of an electron beam source chamber (e.g., by an electron beam tube). A suitable low power electron beam generating apparatus is made by American International Technologies (AIT) of Torrance, Calif. and designated as the MIN-EB™ CBT-101 model fitted with a ST-01–5050 model electron beam tube which requires minimal radiation shielding. See U.S. Reissue No. 35,203 assigned to AIT and incorporated herein by reference in its entirety. Suitable radiation shielding materials include, but are not limited to, leaded acrylic, lead oxide epoxy, lead, other metals and leaded glass such as those available from Nuclear Associates of New York.

The electron beam tube is a vacuum tube having a base end and a window end. An extended filament is disposed within the beam tube proximate to the base end. The filament generates electrons in conjunction with electron beam forming electrodes. The electrons from the filament (i.e., electron beam source) are directed toward and through the beam window of the electron beam tube. A low power electron beam tube is preferred. The beam energy from a low power beam tube is below about 125 kV (kilovolts), typically between about 15–80 kV (or any value therebetween), more typically between about 20–75 kV and most typically between about 30–65 kV. The voltage to the power supply (input voltage from about 10 to about 1,000 volts) is preferably about 110 volts (or less) and its operating power is preferably about 100 watts (or less). However, the output voltage of the beam tube may be between 20–100 kV or any value therebetween. Likewise, the operating power of the electron beam may be from about 10–1,000 watts or any value therebetween.

The window of the low power beam tube should be sufficiently transparent to the low power electron beam to transmit sufficient energy to cure the logo ink or the production ink of the present invention. For example, the window should be sufficiently transparent to permit passage of sufficient E-beam energy to cure a layer of a logo ink or a production ink on a golf ball or game ball.

The electron beam filament is displaced at a first distance from the beam window within the electron beam tube. The first distance is from about 0.01 to about 15 centimeters or any value therebetween, typically, from about 1.0 to about 12 centimeters (cm) and, more typically, from about 1.5 to about 4 centimeters. The electron beam window in a low power beam tube is typically made of a thin (e.g., about 1–10 microns or any value therebetween; preferably about 2.5 microns), low Z material such as carbide, nitride or doped silicon (e.g., boron nitride, silicon carbide, silicon nitride, boron carbide, boron nitride hydride and boron doped silicon) or mixtures thereof. Preferably, the beam window has dimensions of about 2×25 mm.

The logo ink layer or the production ink layer to be cured is maintained at a second distance from the beam window. The second distance is typically from about 1 mm to about 15 centimeters or any value therebetween, more typically between about 0.5 cm to about 5 cm and most typically between about 1.0 to about 2.0 centimeters. For suitable cure, as the second distance is increased, the operating power is also increased and vice versa. Further, if logo ink or production ink, for example, on a golf ball is to be cured, the ball is rotated, preferably fully rotated, during EB irradiation and cure. The rotation rate should be sufficient to irradiate and cure any ink logos or production prints on the golf ball, game ball, or the like as they pass the electron beam tube curing station on the assembly line.

Without being bound by theory, it is further believed that curing is inhibited by oxygen. Thus, the coated golf balls of the invention are preferably surrounded by a gas, for example, an inert gas (e.g., argon, helium) or by nitrogen, by air or mixtures thereof during irradiation and cure. During curing, the electron beam causes the beam window temperature to rise. Thus, the beam window is preferably exposed to at least one of these gases at a flow rate sufficient to prevent cracking, breaking, overheating, melting or otherwise damaging the beam window (i.e., maintaining the integrity of the beam window). Typically, the gas flow over the window prevents rapid temperature increases (i.e., overheating) of the beam window. The gas flow rate should be sufficient to maintain the transparency and the integrity of the window. For example, nitrogen gas at a flow rate from about 0.5 to about 30 cubic feet per minute (CFM) or more is sufficient to maintain the integrity of the beam window during curing. Further, the irradiation time (i.e., residence time) is about 5 seconds or less, typically from about 0.1 seconds to about 10 seconds or any value therebetween. Preferably, the residence time is from about 300 millisecond (ms) to about 3 seconds and most preferably from about 500 ms–1.5 seconds. It is preferred to use a minimum residence time to maximize production.

Further, it is preferred that the electron beam 5 have a beam width suitable to expose the ink surface to be cured. Preferably, the cure speed achievable with electron beam radiation is in the order of about 200 ft/second or less. The electron beam irradiation and curing may be accomplished with an array of electron beam tubes or with a single electron beam tube.

Having described the invention, the following examples are provided to illustrate specific applications thereof, including the best mode now known to perform the invention. These specific examples are not intended to limit the scope of the invention described herein.

EXAMPLES

Two inks, designated as "A" and "B" (see Tables I and II, infra), were pad printed on two roughened SURLYN® golf ball covers to form production prints. Additionally, unmodified ink C was pad printed on a roughened SURLYN® golf ball cover to form a control production print. Thereafter, the production prints of inks A and B were cured with electron beam radiation for a residence time of about 5–6.25 seconds with an AIT Min-EB™-CBT-101 model modified electron beam processor operating at 200 microamps and 50 watts power, an input voltage of about 110 volts to the power supply, 30–75 kV operating beam voltage, a first distance of 4–8 inches, a second distance of about 1.5 cm, a ball (e.g., golf ball having a diameter of about 1.7") rotation rate of about 75 revolutions per minute (1.25 rotations/second), an electron beam width of about 1 inch, a 2×25 mm beam window of 2.5 micron thickness made of Sinocil™ and ball cooling with about 0.5–30 cubic feet per minute (CFM) of nitrogen. The Min-EB™-CBT-101 was modified to accept a golf ball and golf ball rotation device such that the second distance was maintained about 1.5 centimeters (cm). The Min-EB™-CBT-101 was fitted with a Model ST-01–5050 electron beam bulb (i.e., electron beam tube) from AIT. The production print of ink C was air dried at ambient temperature (e.g., about 25° C.) for about 3 hours. After electron beam curing of inks A and B and air drying of ink C, the balls were coated with an overcoat of a water based urethane (e.g., PPG S-24455) and then the overcoat was topcoated with a 2 part urethane topcoat (e.g., PPG S-24853). These pad printed balls were then tested as indicated below. The test results are provided in Table II.

For a production ink to have sufficient intercoat adhesion (e.g., adhesion to a golf ball cover or primer coat and adhesion to a topcoat or overcoat after electron beam radiation curing) in accordance with the present invention, the production ink should exhibit adhesion of at least about 75% of the inked surface of, for example, a golf ball especially when subjected to about 200 "hard" impacts with a metal plate traveling at about 90 miles per hour just prior to impact.

Intercoat adhesion of production ink is measured by several methods. A first method involves abrasion testing wherein production inked golf balls are tumbled for about three hours (to determine the effect on intercoat adhesion) as indicated below.

Tumble Test (Adhesion Test) on Coating Durability

A tumble test was designed to gauge abrasion/scuff resistance to duplicate the wear and abrasion characteristics of range golf balls. The test utilizes E252 Alundum (granule size SM8) and small marble chips as the tumble media.

Operating Procedure

Step 1. Using a cast aluminum scoop, place 2 level scoops of E252 Alundum (granule size SM8) and 2 level scoops of small marble chips into a ball mill.
    Note: 1 scoop of Alundum weighs about 1.78 pounds. 1 scoop of small marble chips weighs about 1.71 pounds.
Step 2. Place total of 24 balls (test balls and control balls, if any) into the ball mill.
    Note: It is recommended that each group consists of 6 balls.
Step 3. Add two more level scoops of Alundum and marble chips into the ball mill (over the balls).
Step 4. Lock the ball mill lid.
Step 5. Position the ball mill sideways on a rotation device (e.g., manufactured by Norton).
Step 6. Turn the rotation device power "ON".
Step 7. Tumble the balls continuously for 3 hours at about 60 revolutions per minute (i.e., of the rotation device).
Step 8. At the end of 3 hours, turn the rotation device off.
Step 9. Remove the ball mill from the rotation device.
    Place the ball mill right side up (i.e., upright) on the floor.
Step 10. Unlock the ball mill lid.
Step 11. Pick out the 24 balls from the ball mill.
Step 12. Using a Nessler tube brush, rinse and brush the balls under a water faucet. Add soap and scrub with a brush.
Step 13. Dry the balls with towels. Divide them into their respective groups.
Step 14. Visually examine the ink durability of the test balls.

A second test involves subjecting a production inked golf ball to a number of random collisions with a non-elastic surface (e.g., a grooved steel plate) at a high speed (e.g., about 90 miles per hour). Preferably, the speed of the non-elastic surface is at least about 90 miles per hour upon impact with the ball.

A third test involves conducting a tape adhesion test such as ASTM test D-3359-87 (Method B) as applied to production ink images, for example, on a golf ball. The tape adhesion test was conducted prior to application of any topcoat and/or overcoat. After each test, the production inked golf balls were visually inspected to determine the integrity of the production image tested. Table I indicates the production ink compositions tested. The results of these tests are indicated in Table II below.

As indicated in Table II, both Ink A and Ink B balls showed no production print image degradation from the Tape Adhesion Test. Whereas, unmodified Ink C exhibited greater than 65% image degradation. Likewise, the tumble test left the production prints of Inks A and B on the golf balls with minimal image degradation. Further, with the 200 Hit Test, the production prints of Inks A and B exhibited minimal image degradation. For Inks A and B, less than 5% of the production print image integrity was lost due to the 200 Hit Test. In comparison, unmodified Ink C exhibited severe image degradation due to the 200 hit test wherein 85–90% of the image integrity was lost.

TABLE I

| | Production Ink Composition | | |
|---|---|---|---|
| | Modified Ink A | Modified Ink B | Unmodified Ink C |
| Ink Base Composition | Trans-tech UVA ink (containing carbon black) - 65% by weight | Trans-tech UVA ink without photoinitiator (free of photo-initiator; containing carbon black) 65% by weight | Gotham Ink ® (Black Ink Formula 43770; Product Code 9241), a nitro-cellulose stock ink containing carbon black |
| Adhesion Promoting Component 1 | SB0520E35 - 10% by weight | SB0520E35 - 10% by weight | |
| Flexibility Promoting Component | CN-966M90 - 20% by weight | CN-966M90 - 20% by weight | |
| Colorant | Carbon black already included in ink base | Carbon black already included in ink base | Stock Carbon Black as provided in Gotham Ink ® Formula 43770 |
| Solvent | Ethyl-3-ethoxy propionate - 5% by weight | Ethyl-3-ethoxy propionate - 5% by weight | Stock solvent provided in Gotham Ink ® Formula 43770 |

TABLE II

Test Results of Production Ink Images

|  | Ink A | Ink B | Ink C |
|---|---|---|---|
| Tape Adhesion Test[1,2] | 5B/10 | 5B/10 | 0B |
| Tumble Test[2] | 9 | 9 | 1 |
| 200 Hit Test[3,2] | 9 | 9 | 1 |
| 500 Hit Test[4] | — | — | — |
| % of Inked Surface Image Integrity Loss by 200 Hit Test | <5% | <5% | 85–90% |
| Cover Polymer | SURLYN ® | SURLYN ® | SURLYN ® |
| Undercoat Composition | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co. |
| Top Coat Composition | PPG-S24853 | PPG-S24853 | PPG-S24853 |

[1]ASTM D3359-87 (Method B); 0B = >65% degradation, 1B = 50% degradation, 2B = 40% degradation, 3B = 30% degradation, 4B = 10% degradation, 5B = 0% degradation
[2]Test results are indicated on a numerical scale of 1–10 wherein
1 = severe image degradation
3 = nearly severe image degradation
5 = moderate image degradation
7 = nearly moderate image degradation
9 = minimal image degradation
10 = no visible image degradation
[3]Production ink balls were randomly hit with a golf club at about 90 miles per hour—200 times.
[4]Production ink balls were randomly hit with a golf club at about 90 miles per hour—500 times.

What is claimed is:

1. An electron beam radiation curable water-insoluble production ink for forming an inked surface on at least a portion of a surface of a ball, at least said inked surface thereafter being coated with a topcoat, said ink comprising:
    (a) prepolymer having at least two prepolymer functional moieties, said prepolymer being selected from the group consisting of a first acrylate, an ester and mixtures thereof;
    (b) a polymerizable monomer; and
    (c) an adhesion promoting component of a carboxylic acid functional oligomer having a carboxylic acid number of at least about 100, said component being sufficient to maintain adhesion of at least 75% of said inked surface to said topcoat and to said ball surface upon electron beam radiation curing said ink and after coating said ink with said topcoat.

2. The production ink of claim 1, wherein said carboxylic acid number is between about 100 to about 300 and wherein said adhesion promoting component is present in an amount of between about 5 to about 25% by weight of said total weight.

3. The production ink of claim 1, wherein said adhesion promoting functional moiety comprises at least about 2 moles of a carbonyl functionality per mole of said adhesion promoting component.

4. The production ink of claim 3, said adhesion promoting functional moiety comprises between about 3 to about 12 moles of said carbonyl functionality per mole of said adhesion promoting component.

5. The production ink of claim 1, wherein said ink is applied to a golf ball and wherein adhesion of said ink is maintained after said golf ball having said cured inked surface is subjected to at least about 100 random collisions with a non-elastic surface at least at about 90 miles per hour.

6. The production ink of claim 1, wherein said adhesion promoting component is selected from the group consisting of an acrylate oligomer, an aromatic acid acrylate ester, an aromatic acid methacrylate ester and mixtures thereof.

7. The production ink of claim 1, wherein said adhesion promoting functional moiety is selected from the group consisting of a carboxylic acid, an ester, an anhydride and mixtures thereof.

8. The production ink of claim 1, wherein said ink further comprises a viscosity reducing component having a molecular weight from about 100 grams per mole to about 1000 grams per mole and is selected from the group consisting of acrylate monomers, acrylate oligomers and mixtures thereof.

9. The production ink of claim 8, wherein said viscosity reducing component is present in an amount between about 10 to about 50 percent by weight of a total weight of said adhesion promoting component.

10. The production ink of claim 1, wherein said ink is applied to a golf ball and wherein said golf ball comprises a cover made from a polymer selected from the group consisting of an ionomer, balata, a polyurethane, a polyolefin and mixtures thereof.

11. The production ink of claim 1, wherein said ink further comprises a flexibility promoting component having a post cure elastic modulus of between about 200 to about 60,000 pounds per square inch and a post cure elongation of between about 5 to about 350%.

12. The production ink of claim 11, wherein said flexibility promoting component is selected from the group consisting of a second acrylate, a ring opening heterocycle and mixtures thereof and wherein said ring opening heterocycle is selected from the group consisting of cyclic ethers, cyclic lactones, cyclic sulphides, cyclic acetals, cyclic siloxanes and mixtures thereof.

13. The production ink of claim 12, wherein said second acrylate is selected from the group consisting of aliphatic acrylates, aromatic acrylates and mixtures thereof.

14. An electron beam radiation curable water-insoluble logo ink for forming an inked surface on at least a portion of a topcoated surface of a ball, said ink comprising:
    (a) a prepolymer having at least two prepolymer functional moieties, said prepolymer being selected from the group consisting of an acrylate, an ester and mixtures thereof;
    (b) a polymerizable monomer; and
    (c) a toughening agent, selected from the group consisting of an isobornyl acrylate, tetrahydrofurfuryl acrylate, dicyclopentenyl oxyethyl acrylate, isobornyl methacrylate, tetrahydrofurfuryl methacrylate, and mixtures thereof, said toughening agent being sufficient to maintain adhesion of said ink to said topcoat of at least about 75% of said inked surface after electron beam radiation curing.

15. The logo ink of claim 14, wherein said toughening agent is present between about 5–75% by weight of said ink.

16. The logo ink of claim 14, further comprising a friction reducing agent.

17. The logo ink of claim 16, wherein said friction reducing agent is selected from the group consisting of a dimethylpolysiloxane, a silicon acrylate and mixtures thereof.

18. The logo ink of claim 17, wherein said friction reducing agent is present between about 0.1–10% by weight of said ink.

19. The logo ink of claim 14, further comprising a solvent and a colorant.

20. The logo ink of claim 14, wherein said colorant is a pigment or a dye.

* * * * *